UNITED STATES PATENT OFFICE.

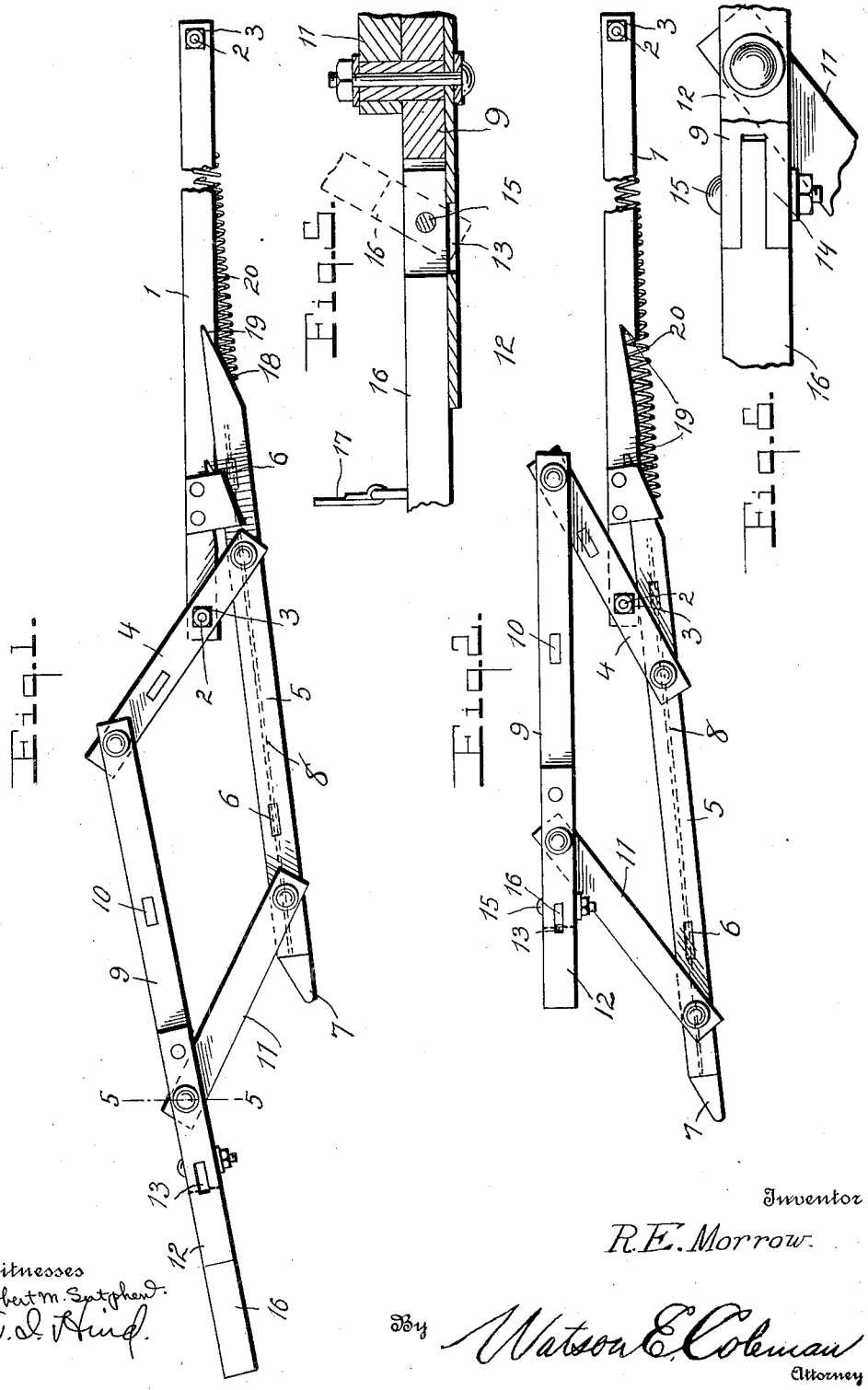

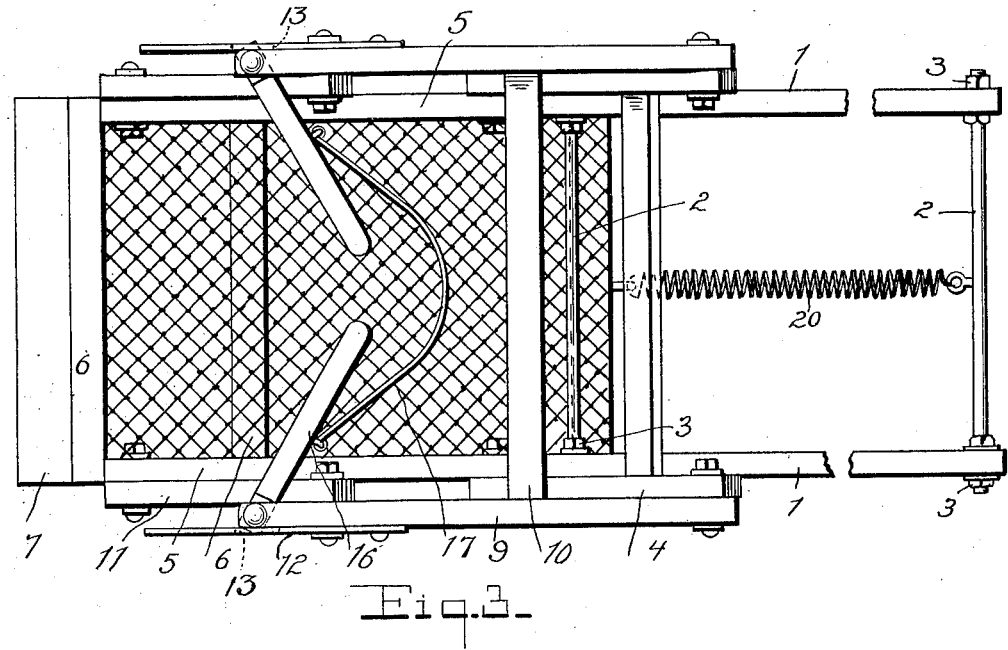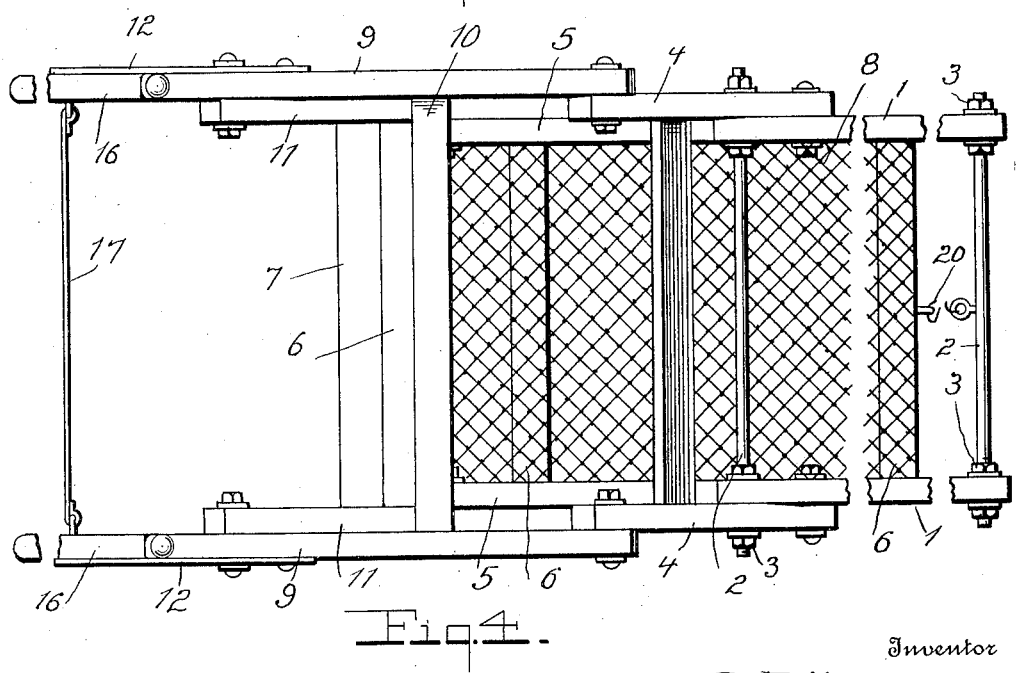

RICHARD E. MORROW, OF BROKEN ARROW, OKLAHOMA.

FENDER.

1,084,026.  Specification of Letters Patent.  Patented Jan. 13, 1914.

Application filed November 12, 1912. Serial No. 730,996.

*To all whom it may concern:*

Be it known that I, RICHARD E. MORROW, a citizen of the United States, residing at Broken Arrow, in the county of Tulsa and State of Oklahoma, have invented certain new and useful Improvements in Fenders, of which the following is a specification, reference being had to the accompanying drawings.

This invention relates to fenders which are particularly adapted for use on street cars, but which may also be applied to automobiles, electric trains, or other moving vehicles.

An object of this invention is the provision of a fender which is provided with a pair of pivoted retaining arms disposed above the net of the fender, the arms being closed by the person struck, for preventing the person from falling from the fender.

A further object of this invention is the provision of a fender which is composed of an upper and lower frame, the frames being pivotally connected by links, the upper frame being moved rearwardly and the lower frame forwardly when a person is struck, and the upper frame being provided with a pair of pivoted retaining arms which are adapted to close about the person struck to prevent him from falling off of the fender.

With these and other objects in view which will become apparent as the description proceeds, my invention resides in the novel constructions, combinations and arrangements of parts to be hereinafter more fully described, claimed and illustrated in the accompanying drawing, in which—

Figure 1 is a side elevation of the fender in open position. Fig. 2 is a side elevation of a fender in closed position. Fig. 3 is a top plan view thereof in closed position. Fig. 4 is a top plan view in open position. Fig. 5 is a fragmentary top view of one of the retaining arms and the locking means therefor partly in section. Fig. 6 is a side elevation of one of the retaining arms showing its connection with the frame.

Referring more particularly to the drawing, the numeral 1 indicates a pair of supporting arms which are adapted to be rigidly secured to the forward end of the car truck and project outwardly therefrom, and the arms are connected at their opposite ends by cross bars 2. The opposite ends of the cross bars 2 are threaded and nuts 3 are disposed on the bars on the opposite sides of the arms 1 so that the arms may be adjusted to conform to the width of the vehicle. Pivotally mounted upon the opposite ends of the forward cross bar 2 are a pair of links 4 which are adapted to connect the upper and lower frames of the fender. The lower frame of the fender comprises a pair of longitudinally extending parallel bars 5, which are connected by a plurality of cross bars 6, the forward bar of which is provided with a rubber buffer 7. The upper face of the lower frame is covered by a net 8 which may be of woven wire or any other suitable material.

The upper frame of the fender comprises a pair of longitudinally extending bars 9 which are pivotally secured at their rear ends to the upper ends of the links 4 and are suitably connected by cross bars 10. The forward ends of the bars 5 and 9 are also pivotally connected by a link bar 11, and secured to the opposite faces of the bars 9 at their forward ends are spring arms 12 which project beyond the ends of the bars 9 and are provided with slots 13. The forward ends of the bars 9 are bifurcated as at 14, and secured between the furcations by bolts 15 are the reduced inner ends of a pair of retaining arms 16. The retaining arms 16 are normally extended forwardly and are connected by a flexible belt 17 against which the person in the path of the vehicle will fall.

The inner ends of the bars 5 of the lower frame are beveled as at 18 to form pawls which are adapted for engagement with the notches 19 formed in the lower faces of the supporting bars 1. A contractile spring 20 is connected at one end to the inner bar 2 of the arms 1 and at its other end to the inner cross bar 6 of the lower frame, the spring being adapted to normally maintain the pawls 18 in engagement with the notches 19 in the arms 1.

When the fender is in a position for use the retaining arms 16 extend forwardly from the fender and the pawls 18 of the lower frame are normally engaged with the inner notches 19 of the arms 1. In this position the upper frame of the fender is disposed forwardly of the lower frame, and when a person is struck he is adapted to be engaged by the flexible belt 17, whereupon the retaining arms 16 will be closed and the upper frame of the fender moved rearwardly simultaneously with the forward movement of the lower frame, whereupon the person will be maintained in a standing position upon the net 8 of the lower frame and will be prevented from falling from the fender by the retaining arms 16 and the belt 17. It will be seen that when the upper frame is moved rearwardly and the lower frame forwardly, the pawls 18 will engage the outermost notches 19 in the arms 1 and will be maintained therein by the action of the spring 20. It will be seen that when the retaining arms 16 are moved rearwardly they are closed against the action of the spring arms 12, and when they are in closed position, the reduced inner ends of the arms 16 will engage the slots 13 in the arms 12, whereby the retaining arms 16 will be securely held in closed position to prevent the person supported on the fender from falling therefrom.

It will be noticed that the links 4 are connected to the forward ends of the bars 1 at a point below the longitudinal center of the links 4 whereby the upper frame is afforded a greater leverage than the lower frame, so that the distance between the lower frame and the ground will not be materially changed during the operation of the device, whereby the lower frame may be disposed closely adjacent to the ground so that any objects lying upon the track may be picked up on the lower frame independent of the upper frame of the fender. By this construction it will be seen that objects which are standing or lying upon the track will be picked up by the fender and that special provision is made for preventing injury to persons struck by the fender when in an upright position. Owing to the flexibility of the belt 17, the person struck by the fender will receive only a slight shock, as the moment the person is struck the retaining arms 16 are adapted to close about him and he will be maintained in a standing position on the net 8 by reason of the pivotal connection between the upper and lower frames of the fender and the automatic locking of the retaining arms 16.

It will be seen from the above description taken in connection with the accompanying drawing, that I have provided a fender which will pick up a person standing upon the track and safely conduct him out of danger, and that I have provided a fender which may be cheaply manufactured, and which will fulfil all the requirements of such a device.

What I claim:

1. A fender comprising a pair of horizontal arms connected at their rear ends to a vehicle, links pivotally connected to the other ends of the arms, upper and lower frames pivotally connected to the respective upper and lower ends of said links, a net secured to the lower frame, and means connected to the upper frame for retaining a body upon the net.

2. A fender comprising an upper and a lower frame, said frames being pivotally connected together and adapted for forward and rearward movement, a net secured to the lower frame, and retaining arms pivotally connected to the upper frame.

3. A fender comprising an upper and a lower frame, said frames being pivotally connected together and adapted for forward and rearward movement, a net secured to the lower frame, retaining arms pivotally mounted in the upper frame, and means for maintaining said retaining arms in a closed position.

4. A fender comprising an upper and a lower frame, said frames being pivotally connected together and adapted for forward and rearward movement, a net secured to the lower frame, and retaining arms pivotally connected to the upper frame, as and for the purpose set forth.

5. A fender comprising an upper and a lower frame, said frames being pivotally connected together and adapted for forward and rearward movement, a net secured to the lower frame, retaining arms pivotally mounted in the upper frame, and means connected to said upper frame for maintaining said retaining arms in closed position.

6. A fender comprising a pair of frames pivotally connected together, a net secured to one of said frames, retaining arms pivotally mounted in the other frame, a flexible belt connecting said retaining arms, and means for maintaining said retaining arms in closed position.

7. A fender comprising a pair of horizontal supporting arms connected at their rear ends to a vehicle, links pivotally connected to the other ends of said supporting arms, upper and lower frames pivotally connected to the upper and lower ends of said links, a net secured to said lower frame, retaining arms pivotally connected to the upper frame, said links being connected to the supporting arms at a point to one side of the longitudinal center of the links, as and for the purpose described.

8. A fender comprising an upper frame and a lower frame, said frames being pivotally connected together and adapted for forward and rearward movement, a net secured to the lower frame, retaining arms pivotally mounted in the upper frame, a flexible belt connecting said retaining arms, and slotted spring members connected to said upper frame for maintaining said arms in closed position.

9. A fender comprising an upper and lower frame, said frames being pivotally connected together and adapted for forward and rearward movement, a net secured to the lower frame, retaining arms pivotally mounted in the upper frame, and adapted to swing inwardly over said net, a flexible belt connecting said retaining arms, slotted spring members secured to said upper frame, said retaining arms being adapted to project within the slots in said spring members when said arms extend inwardly of said frame, as and for the purpose described.

10. A fender comprising a pair of horizontal arms connected at their inner ends to a vehicle, links pivotally connected to the outer ends of the arms, upper and lower frames pivotally connected to the upper and lower ends of said links, said frames consisting of longitudinally extending bars and cross rods connecting said bars, said frames being adapted for forward and rearward movement, a net secured to the lower frame, retaining arms pivotally connected to the upper frame, the longitudinally extending bars of the lower frame being adapted to engage said arms to maintain said lower frame in its forward or rearward position, as and for the purpose described.

11. A fender comprising a pair of horizontal arms connected at their inner ends to a vehicle, links pivotally connected to the outer ends of said arms, upper and lower frames pivotally connected to the upper and lower ends of said links, a net secured to said lower frame, retaining arms pivotally connected to the upper frame, said arms being formed on their under faces with spaced notches, said frames consisting of longitudinally extending bars and cross rods connecting said longitudinal bars, the longitudinal bars of the lower frame being adapted to engage in the notches in said arms to maintain the lower frame in its forward or rearward position, as and for the purpose described.

12. A fender comprising a pair of horizontal arms connected at their inner ends to a vehicle, upper and lower frames operatively connected to the outer ends of said arms and adapted for forward and rearward movement, said frames consisting of longitudinally extending bars and cross rods connecting said longitudinal bars, said arms being provided on their under faces with spaced notches, the inner ends of the longitudinal bars of the lower frame being beveled, the beveled portions of said bars being adapted for engagement in the notches in said arms to maintain the lower frame in its forward or rearward position, means for maintaining said beveled portions in engagement with said notches, a net secured to the lower frame, and retaining arms pivotally connected to the upper frame, as and for the purpose described.

13. A fender comprising an upper and a lower frame, said frames being pivotally connected together and adapted for forward and rearward movement, a net secured to the lower frame, retaining arms pivotally mounted in the upper frame, and means for maintaining said frames in their relative forward and rearward positions, as and for the purpose described.

In testimony whereof I hereunto affix my signature in the presence of two witnesses.

RICHARD E. MORROW.

Witnesses:
 Ed Wells,
 W. P. Fraker.

---

Copies of this patent may be obtained for five cents each, by addressing the " Commissioner of Patents, Washington, D. C."